United States Patent
Chien et al.

(10) Patent No.: US 6,754,756 B2
(45) Date of Patent: Jun. 22, 2004

(54) GPS CARD READER

(75) Inventors: Cheng-Chih Chien, Taichung (TW); Bing-Fei Wu, Hsinchu (TW); Jou-Wei Fu, Hsinchu (TW); Lung-Yi Kuo, Taichung (TW); Chung-Chi Tien, Taichung (TW)

(73) Assignee: Feiya Technology Corp., Hsinchu (TW)

( * ) Notice: Subject to any disclaimer, the term of this patent is extended or adjusted under 35 U.S.C. 154(b) by 511 days.

(21) Appl. No.: 09/924,994

(22) Filed: Aug. 8, 2001

(65) Prior Publication Data

US 2003/0033462 A1 Feb. 13, 2003

(51) Int. Cl.[7] .......................... G06F 13/00; G01C 21/26
(52) U.S. Cl. ...................................... 710/300; 701/200
(58) Field of Search ................................ 710/100, 305, 710/300, 301, 302, 303, 304, 313, 314; 701/33, 102, 200, 215

(56) References Cited

U.S. PATENT DOCUMENTS

| | | | | |
|---|---|---|---|---|
| 4,513,377 A | * | 4/1985 | Hasebe et al. | 701/208 |
| 4,862,374 A | * | 8/1989 | Ziemann | 701/200 |
| 5,557,524 A | * | 9/1996 | Maki | 701/35 |
| 5,848,373 A | * | 12/1998 | DeLorme et al. | 701/200 |
| 6,016,476 A | * | 1/2000 | Maes et al. | 705/1 |
| 6,199,044 B1 | * | 3/2001 | Ackley et al. | 704/275 |
| 6,498,984 B2 | * | 12/2002 | Agnew et al. | 701/207 |
| 6,536,670 B1 | * | 3/2003 | Postman et al. | 235/487 |

* cited by examiner

Primary Examiner—Tim Vo

(57) ABSTRACT

A global positioning system (GPS) card reader comprises a bus connection interface, a GPS module, a universal asynchronous receiver transmitter (UART) coupled with the GPS module and a complex programmable logic circuit comprising a complex programmable logic device. The complex programmable logic circuit connects with the bus connection interface and comprises at least: a card information structural (CIS) memory, am address decoder, a power control register, and a storage card coupling for connecting a storage card.

11 Claims, 3 Drawing Sheets

GPS CARD READER

FIELD OF THE INVENTION

This invention relates generally to an expansion or extension device for hand held communication equipments, such as a personal digital assistant (PDA) or the like, particularly to a global positioning system (GPS) card reader.

BACKGROUND OF THE INVENTION

After debut of the personal digital assistant (PDA) not long ago, a lot of associative expansion or extension devices for flash memory or digital camera for example have been developed and commercialized continuously one after another, and meanwhile, on the other hand, a global positioning system (GPS) which is already implemented in aviation or navigation is mushroomed recently for application in vehicles. Consequently, a very important issue is—"How can the GPS work efficiently together with a hand held communication machine?"

SUMMARY OF THE INVENTION

The primary object of this invention is to provide an expansion device capable of dealing with GPS data for a hand held communication equipment.

In order to realize abovesaid object, a GPS card reader of this invention comprises: a bus connection interface; a GPS module; a universal asynchronous receiver transmitter (UART) coupled respectively with the GPS module and a complex programmable logic circuit composed of a complex programmable logic device (CPLD) and coupled to the bus connection interface, wherein the complex programmable logic circuit further comprises a card information structural (CIS) memory, an address decoder, as well as a power control register; and a storage card coupling for connection with a storage card.

The GPS card reader of this invention further comprises: a clock generator coupled respectively with the UART and the complex programmable logic circuit; a power regulator; and a semiconductor memory connected at least with the bus connection interface for storing program codes.

For more detailed information regarding advantages or features of this invention, at least an example of preferred embodiment will be elucidated below with reference to the annexed drawings.

DETAILED DESCRIPTION OF THE INVENTION

Figure 1:
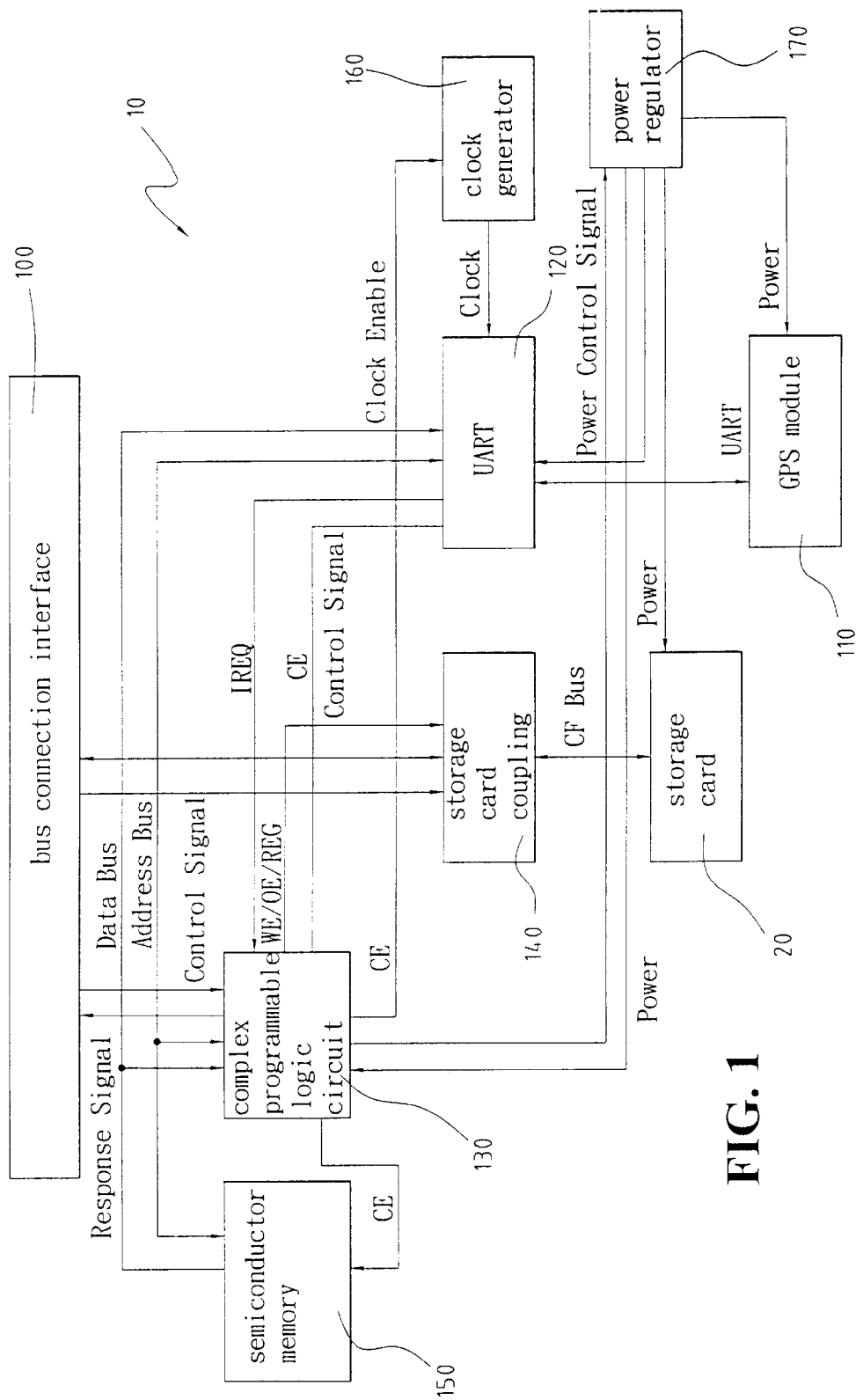
FIG. 1 shows a circuitry framework of this invention.

As indicated in a circuitry framework of this invention shown in FIG. 1, a global positioning system (GPS) card reader 10 comprises: a bus connection interface 100; a GPS module 110; a universal asynchronous receiver transmitter (UART) 120 coupled respectively with the GPS module 110 and a complex programmable logic circuit 130 composed of a complex programmable logic device (CPLD) and coupled to the bus connection interface 100, wherein the complex programmable logic circuit further comprises a card information structural (CIS) memory 130a, an address decoder 130b, as well as a power control register 130c; and a storage card coupling 140 for connection with a storage card 20.

The bus connection interface 100 may be a compact flash (CF) bus connection interface or a connection interface of springboard expansion slot of the Handspring. The GPS module 110 is the same with the conventional for receiving global geographical positional wireless signals and transmitting the same to the universal asynchronous receiver transmitter (UART) 120 via a UART interface of RS232 or the like. The storage card coupling 140 is used to connect the storage card 20, such as a CF memory card, a Secure digital (SD) memory card, a Multimedia card, a Smartmedia card, and embodied substantially as a CF card coupling, a SD memory card coupling, a Multimedia card coupling, or a Smartmedia card coupling. In application, the storage card 20 should be capable of storing at least the e-map data of a district.

Figure 2:
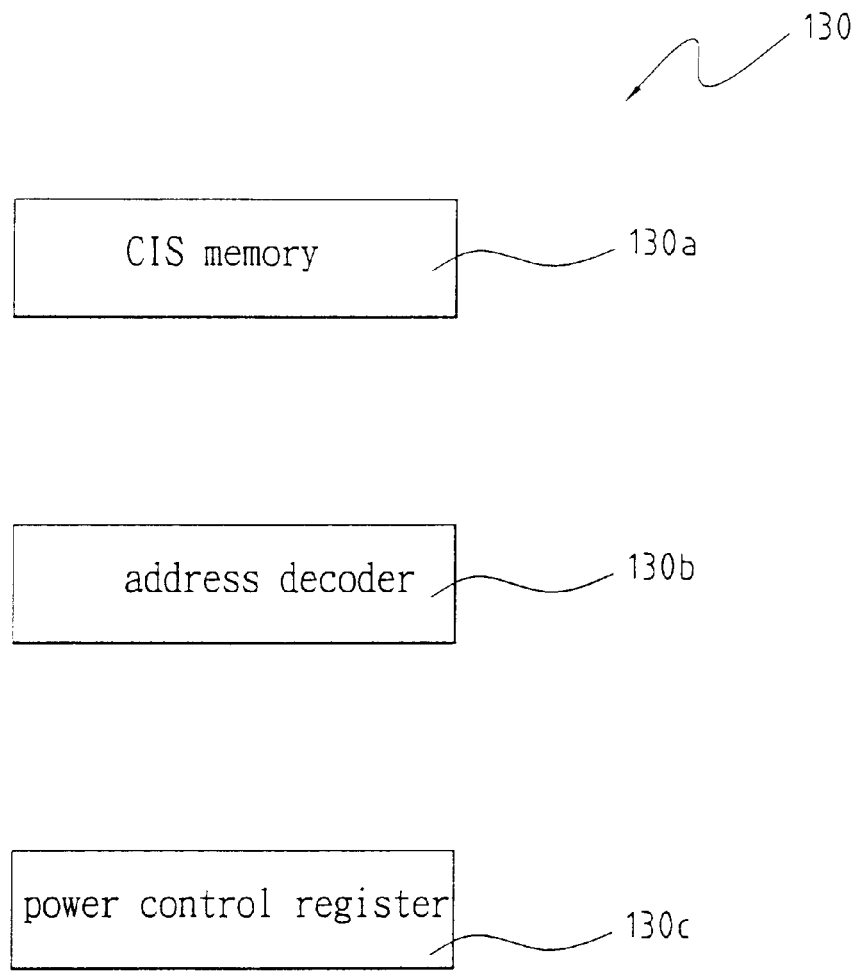
FIG. 2 shows a schematic structure of a complex programmable logic circuit of this invention.

FIG. 2 shows a schematic structure of a complex programmable logic circuit of this invention. The CIS memory 130a is implemented for storing various values defined under CF regulations or interface regulations of springboard expansion slot of the Handspring. The address decoder 130b is arranged to decode signals from the bus connection interface 100 to map individual components of the GPS card reader 10. For example, the address decoder 130b decodes the offset signals of the storage card coupling 140 as of 0~15, the UART 120 as of 16~31, and the power control register 130c as of 32~48.

Moreover, the bits of the power control register 130c are assigned for different functions, such as: bit 0 for controlling power "enable" of the storage card coupling 140; bit 1 for controlling power "enable" of the UART 120; bit 2 for controlling power "enable" of the GPS module 110; bit 3 for resetting the storage card coupling 140; bit 4 for resetting the UART 120; bit 5 for resetting the GPS module 110; and bit 6 for controlling "enable" of a clock generator 160.

Figure 3:
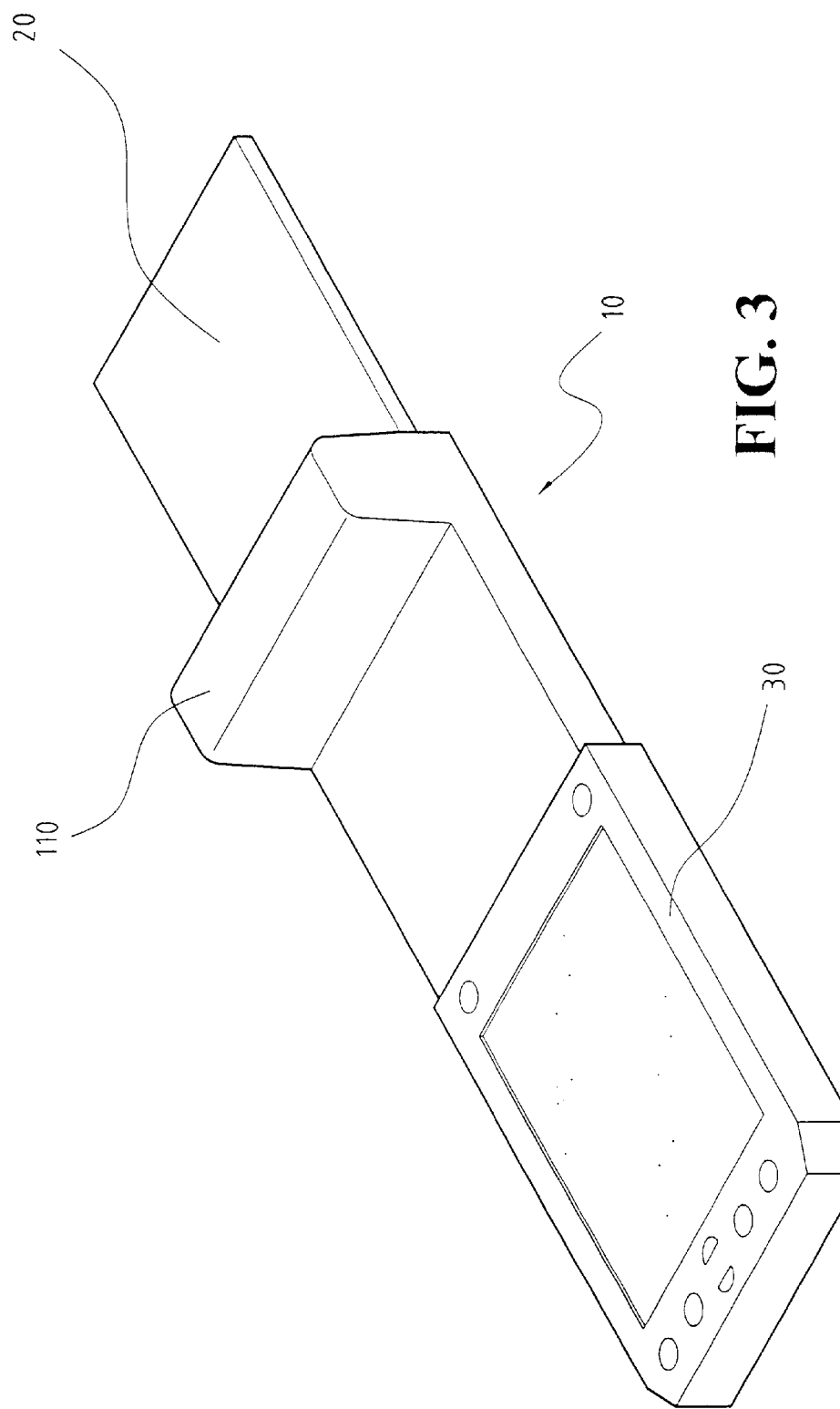
FIG. 3 is a schematic view showing that this invention is applied in a PDA.

FIG. 3 is a schematic view showing that this invention is applied in a personal digital assistant (PDA). A PDA 30 is provided with a connection interface resembling the CF bus connection interface or a connection interface of the springboard expansion slot of the Handspring for connecting the PDA 30 to the GPS card reader 10 which is also in connection with the storage card 20 having deposited at least the e-map data of a district.

The GPS card reader 10 further comprises a semiconductor memory 150, which may be a read only memory (ROM), connected at least to the bus connection interface 100 for storing program codes. As the codes deposited semiconductor memory 150 has already an I.D. code and program codes conforming to the interface regulations of the Handspring, hence it can work in cooperation with the Handspring's PDA without needing of performing setup formalities to the PDA.

In the GPS card reader 10, the clock generator 160 is coupled separately to the UART 120 and the complex programmable logic circuit 130, and a power regulator 170 is used for providing an optimum working voltage.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A global positioning system (GPS) card reader, comprising:

a bus connection interface;

a global positioning system (GPS) module;

a universal asynchronous receiver transmitter (UART) in connection with the GPS module and a complex programmable logic circuit;

the complex programmable logic circuit, which is composed of a complex programmable logic device (CPLD) and coupled to the bus connection interface, further comprising at least a card information structural (CIS) memory, an address decoder, and a power control register; and a storage card coupling for connecting with a storage card.

2. The GPS card reader according to claim 1, further comprising:

a clock generator connected with the UART and the complex programmable logic circuit respectively; and a power regulator.

3. The GPS card reader according to claim 1, further comprising:

a semiconductor memory in connection with at least the bus connection interface for storing program codes.

4. The GPS card reader according to claim 1, wherein the storage card is implemented for storing e-map data.

5. The GPS card reader according to claim 1, wherein the bus connection interface is a compact flash (CF) bus connection interface.

6. The GPS card reader according to claim 1, wherein the bus connection interface is a connection interface of the springboard expansion slot of the Handspring.

7. The GPS card reader according to claim 1, wherein the storage card coupling is a compact flash (CF) connection interface.

8. The GPS card reader according to claim 1, wherein the storage card coupling is a secure digital (SD) memory card coupling.

9. The GPS card reader according to claim 1, wherein the storage card coupling is a Multimedia coupling.

10. The GPS card reader according to claim 1, wherein the storage card coupling is a Smartmedia coupling.

11. The GPS card reader according to claim 3, wherein the semiconductor memory is a read only memory (ROM).

* * * * *